United States Patent [19]

Deering

[11] Patent Number: 5,446,834
[45] Date of Patent: Aug. 29, 1995

[54] METHOD AND APPARATUS FOR HIGH RESOLUTION VIRTUAL REALITY SYSTEMS USING HEAD TRACKED DISPLAY

[75] Inventor: Michael Deering, Los Altos, Calif.

[73] Assignee: Sun Microsystems, Inc., Mountain View, Calif.

[21] Appl. No.: 359,331

[22] Filed: Dec. 6, 1994

Related U.S. Application Data

[63] Continuation of Ser. No. 875,042, Apr. 28, 1992, abandoned.

[51] Int. Cl.[6] ............................................. G06T 17/40
[52] U.S. Cl. ..................................... 395/127; 395/119; 395/155
[58] Field of Search .............. 395/127, 155, 119; 348/745–747, 806, 807, 781

[56] References Cited

U.S. PATENT DOCUMENTS

| 4,028,725 | 6/1977 | Lewis | 358/103 |
|---|---|---|---|
| 5,231,673 | 7/1993 | Elenga | 382/6 |
| 5,367,614 | 11/1994 | Bisey | 395/119 |

OTHER PUBLICATIONS

Robinet and Rollin, "A Computational Model for the Stereoscopic Optics of a Headmounted Display," Computer Science Department, University of North Carolina, Winter of 1992, p. 45.

Primary Examiner—Heather R. Herndon
Assistant Examiner—Michael S. Smith
Attorney, Agent, or Firm—Blakely Sokoloff Taylor & Zafman

[57] ABSTRACT

A method and apparatus for accurate head-tracked stereo display on a workstation CRT is disclosed that corrects inaccuracies caused by CRT optical properties. The correction includes modification of a viewing matrix equation to adjust the physical coordinates of a display window. An alternative correction models the CRT surface as multiple flat "patches" positioned and titled to approximate the spherical or cylindrical shape of the actual screen, and each patch is rendered separately with a patch-specific viewing matrix. Another alternative correction uses angle of view information obtained directly with eye tracking, or indirectly through a "hot spot" determination to bias correction at the point of viewing.

10 Claims, 6 Drawing Sheets

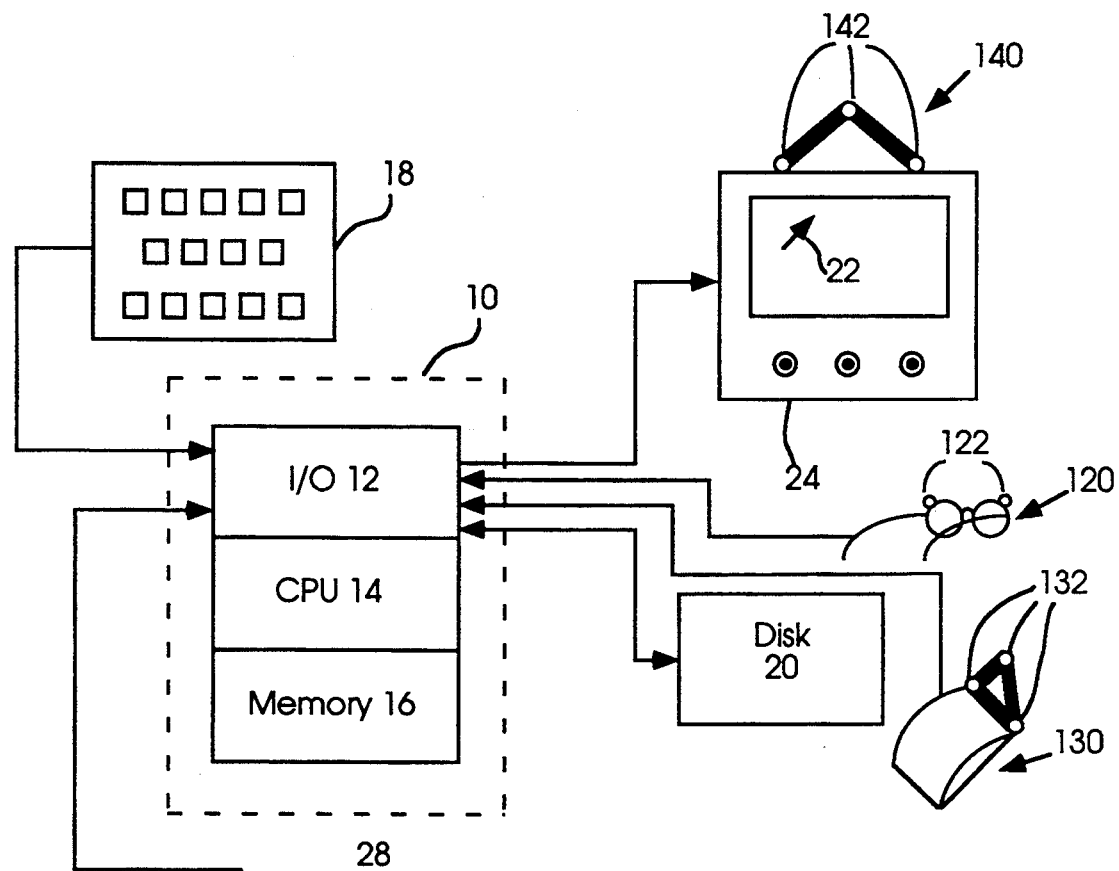
FIGURE 1
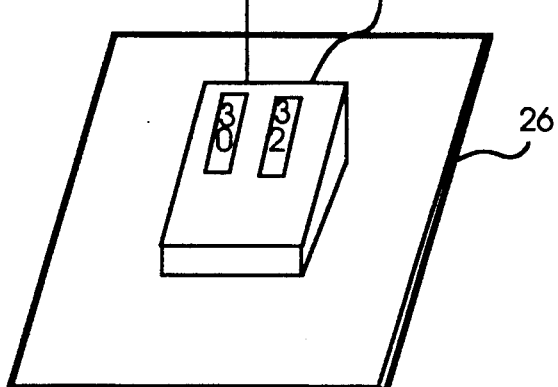
FIGURE 2
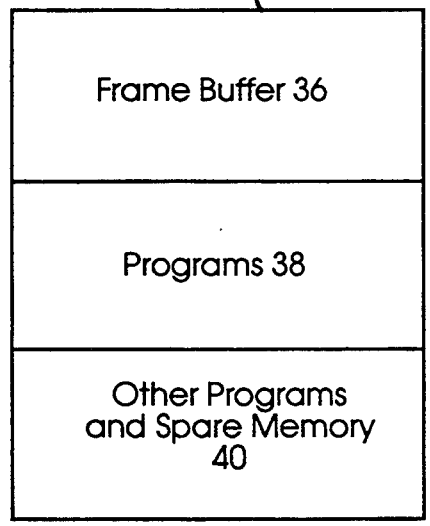

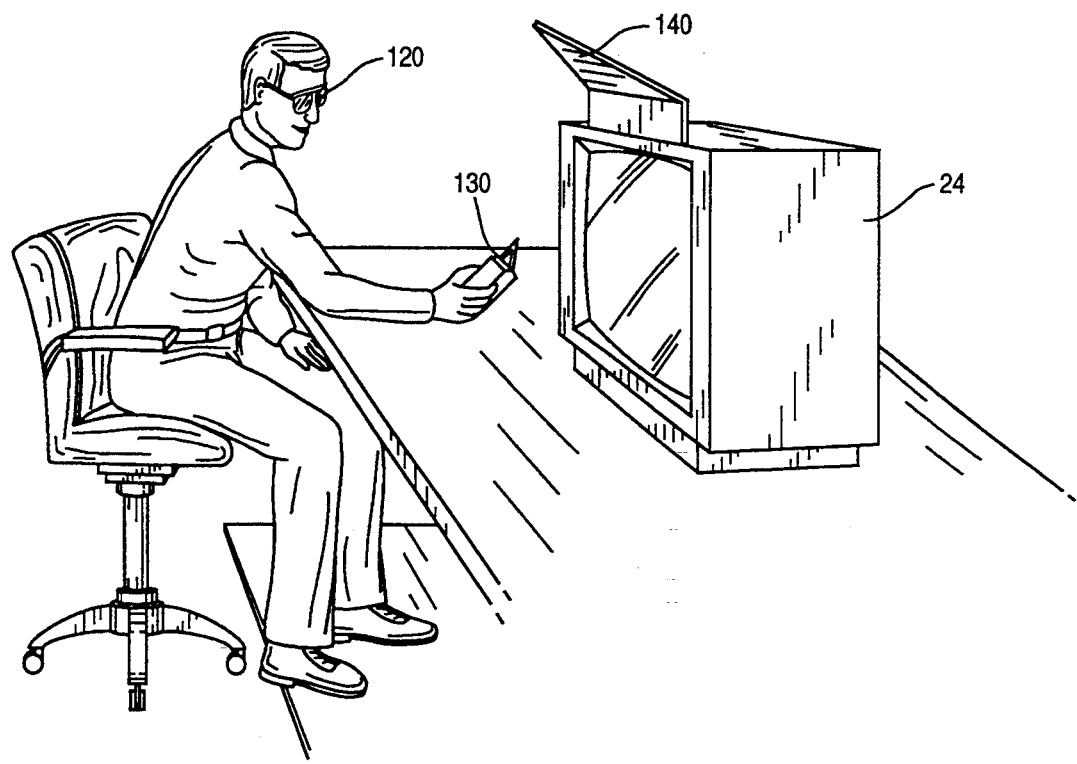
FIG_1A
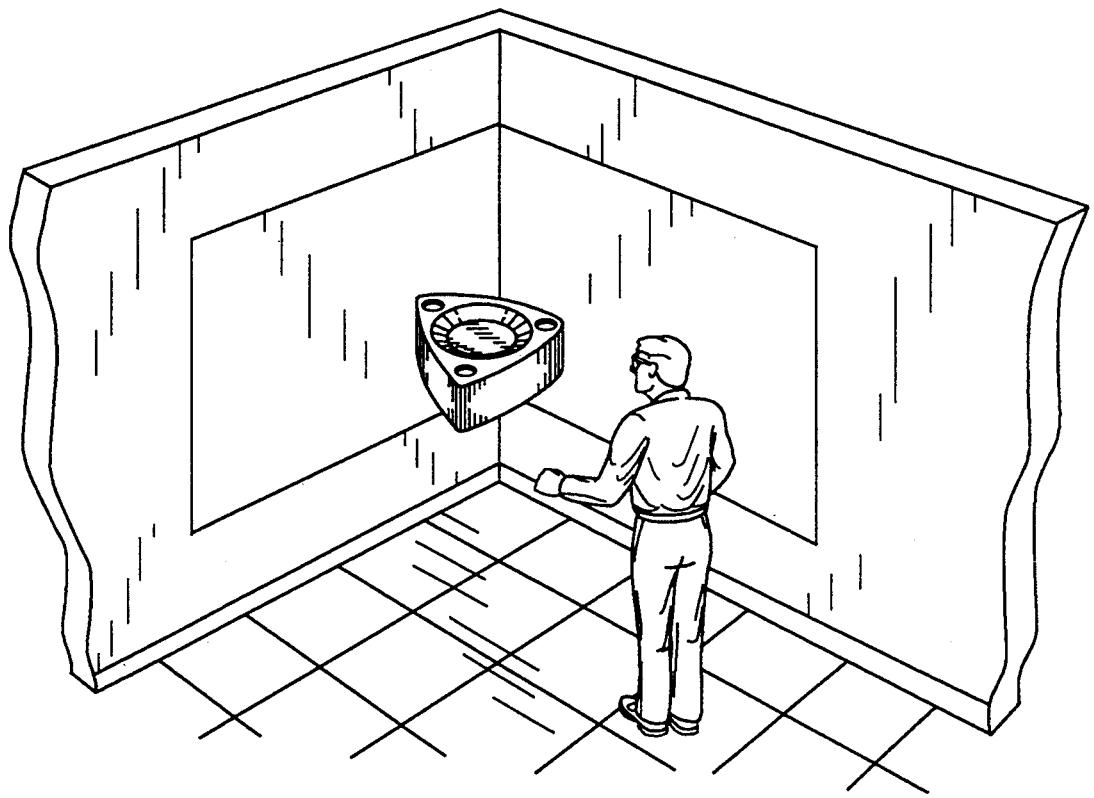
FIG_7

METHOD AND APPARATUS FOR HIGH RESOLUTION VIRTUAL REALITY SYSTEMS USING HEAD TRACKED DISPLAY

This is a continuation of application Ser. No. 07/875,042, filed Apr. 28, 1992, now abandoned.

BACKGROUND OF THE INVENTION

1. Field of the Invention

This invention relates to the field of computer graphics systems. More particularly, this invention relates to generation of high resolution virtual reality images.

2. Art Background

Computer graphics traditionally deals with the generation of an image on a screen in a manner visually faithful to the representation of an image by a camera. However, the human visual system evolved not for viewing photographs, but for close range binocular (stereo) viewing of 3D objects, with unrestricted head motion. Holograms and holographic stereograms support this, providing proper perspective and motion parallax effects. Unfortunately, technology does not yet allow these forms of display to be created in real-time.

An alternate technique for emulating close range examination of a physical object by a user employs a head-tracking device. If a 3D stereo image display system is augmented by a head-tracking device, the synthetic viewpoint of the rendering process can be made to correspond to the actual dynamic physical viewpoint of the user. Such a system dynamically computes a stereo pair of images that has the same appearance as a hologram, and the virtual object appears to remain stationary when the viewer tilts his head, or moves his head to look around its side or over its top. For further discussion regarding head tracked systems, refer to Paley, W. B. *Head-tracking Stereo Display, Techniques and Applications,* Proceedings of SPIE, February 1992.

In practice, making a head-tracked stereo display system work involves achieving an accurate mapping of the mathematical viewing pyramid onto the real world of physical CRT's, biological heads, and human eyeballs. In case of the head mounted displays that are used in today's virtual reality systems, the mathematical-to-physical mapping may only be generally approximated.

However, .many applications of virtual reality do require highly accurate mapping of physical and virtual objects. For example, for a surgeon viewing 3D computer aided tomography (CAT) scan data overlaid on a patient during surgery, the positions of the virtual and real objects must coincide within a fraction of an inch. Also, in electronics and mechanical repair it is desirable to overlay diagnostic and schematic information directly on physical components having dimensions on the order of fractions of an inch. Moreover, with accurate physical/virtual correspondence, direct interaction with virtual objects is possible using virtual tools. For further discussion of virtual reality applications, refer to Rheingold, H. *Virtual Reality,* Summit Books, 1991. See also, *Cyberspace: first steps,* edited by Benedikt, M., The MIT Press, 1992.

Past viewing projection methods used in computer graphics assume that the light-emitting image plane is, in fact, planer. However the phosphor screen of a typical CRT is by design a section of a sphere or of a cylinder, and is viewed through a thick glass faceplate that has an index of refraction significantly higher than that of air. In conventional computer graphics, the inaccuracies produced by ignoring these effects are imperceptible. But for high resolution stereo, the errors produced are significant enough to require correction.

As will be described, the present high resolution virtual reality system enables accurate head-tracked stereo display, and provides the corrections necessary to achieve accurate visual correspondence of physical objects and virtual objects.

SUMMARY OF THE INVENTION

The present high resolution virtual reality system enables accurate head-tracked stereo display, and provides accurate visual correspondence of physical and virtual objects. The virtual reality system corrects inaccuracies caused by refraction of light rays passing through a CRT display screen, as well as inaccuracies caused by positional errors that result from CRT display screen curvature.

The corrections for the CRT optical properties of refraction and display screen curvature are implemented by modifying the viewing matrix equations corresponding to each eye of a viewer. Specifically, the correction is implemented by adjusting the coordinates of the display window in a physical coordinate space.

An alternative embodiment improves the correction by modeling the CRT surface as multiple flat "patches" positioned and titled to approximate the spherical or cylindrical shape of the actual screen. Each patch is rendered separately with patch-specific corrected viewing matrices for the viewer's eye positions.

Another alternative embodiment provides correction by taking into account the direction of the viewer's gaze. Most of the distortions caused by CRT optical properties are only visible to the fovea of each of the viewer's eyes, that is within an angle of 2°–6° of the viewer's gaze direction. If angle of view information is available, either directly as a result of eye tracking, or indirectly through a "hot spot" eye tracking method, then the correction is biased to be correct at the point of view.

BRIEF DESCRIPTION OF THE DRAWINGS

FIG. 1 and 1a illustrate a computer system incorporating the teachings of the present invention, including a stereo CRT, stereo shuttered glasses, a 3D head tracker, and a 3D mouse.

FIG. 2 shows an example arrangement of program storage and frame buffer storage for the system of FIG. 1.

FIG. 7 illustrates an alternative embodiment of the present high resolution virtual reality system that uses large front or rear projection CRT display screens to generate virtual images.

DETAILED DESCRIPTION OF THE INVENTION

Figure 3:
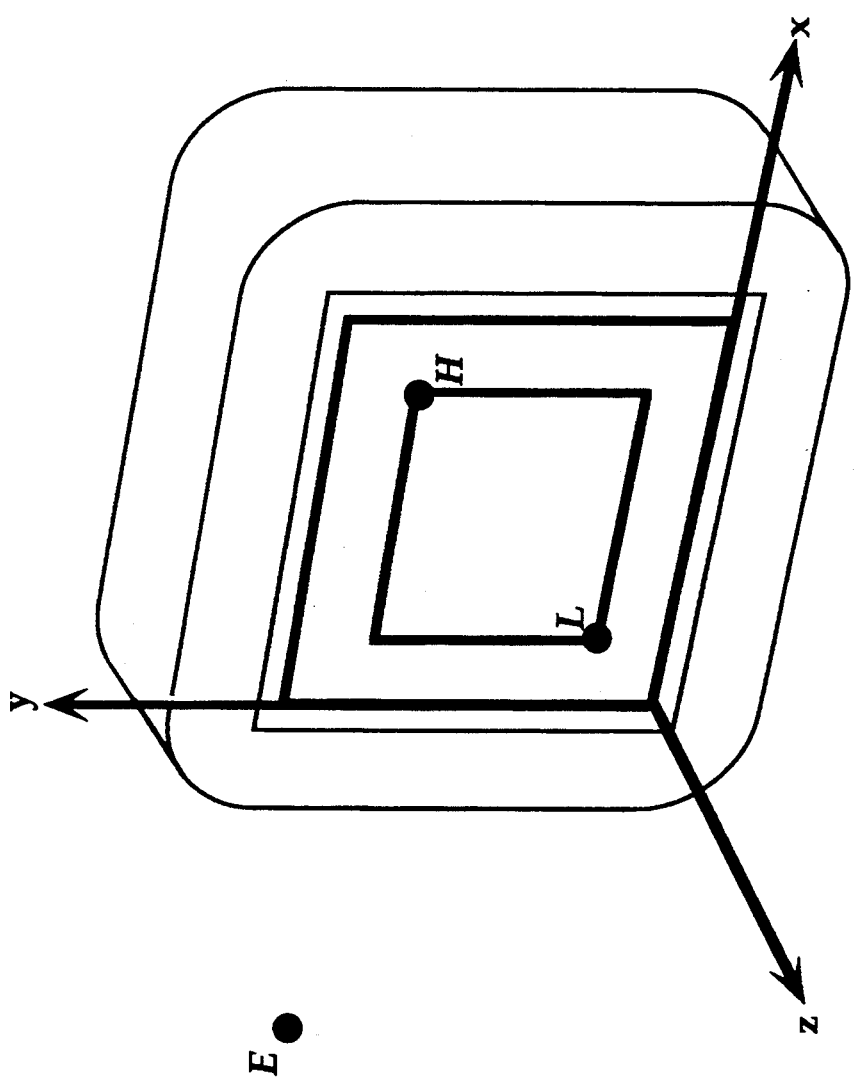
FIG. 3 illustrates an example display plate coordinates (DPC) system, which is a physical coordinate system registered to a display device's display surface.

A high resolution virtual reality system including a head-tracked stereo display that achieves accurate visual correspondence of physical and virtual objects is disclosed. In the following description for purposes of explanation, specific applications, numbers, materials and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

In addition, a video tape entitled High Resolution Virtual Reality Demonstration, submitted concurrently with this Application is provided to further describe the present invention, and is incorporated fully by reference herein.

Referring now to FIG. 1, an exemplary computer based system for generating graphic images and responding to a user's input in accordance with the teachings of the present invention is illustrated. Shown is a computer 10 comprised of three major components. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. A wide variety of raster (or pix-mapped) display may be utilized as display 24. In the current embodiment, the display 24 comprises a field sequential stereo CRT.

A keyboard 18 is shown coupled to the I/O circuit 12 and is used to input data and commands into the computer 10, as is well known. A cursor control device 28 is also shown coupled to the computer 10 through the I/O circuit 12. The cursor control device 28 (commonly known as a "mouse") permits a user to select various command modes, modify graphic data, and input other data. Any well known variety of cursor control device, such as optical mice, mechanical mice, track balls and joy sticks, may be utilized for the cursor control device 28.

A pair of stereo shuttered glasses 120 is shown coupled to the I/O circuit 12. The stereo shuttered glasses 120 include a pair of embedded ultrasonic microphones 122 for receiving ultrasonic sound waves. The stereo shuttered glasses also have embedded an infrared receiver for controlling the shuttered lenses.

A 3D 6-axis mouse 130 is shown coupled to the I/C) circuit 12. The 3D mouse 130 includes a set of three ultrasonic microphones 132 for receiving ultrasonic sound waves. The 3D positions of the 3D mouse 130 and the shuttered glasses 120, relative to the faceplate of the stereo CRT 24, are sensed by a 3D 6-axis head-tracker 140, which is mounted to the stereo CRT 24. The 3D head tracker has embedded three ultrasonic speakers 142 that generate the ultrasonic sound waves to be received by the ultrasonic microphones 122 and 132.

Referring now to FIG. 2, one arrangement of major programs contained within the memory 16 illustrated in FIG. 1 is shown. In particular, there is shown a frame buffer 36, which serves as a pixel map of the display 24. The frame buffer 36 represents the video memory for the display 24, wherein, each storage location in the frame buffer 36 corresponds to a left or right eye pixel on the display 24. Thus, the frame buffer comprises a two dimensional array of points having known coordinates corresponding to the pixels on the raster display 24. The memory 16 also comprises a variety of programs implemented per the teaching of the present invention 38, as disclosed in this specification, for execution by the CPU 10. Additionally, the memory 16 further comprises other programs for controlling or performing other well known functions and operation on computer systems.

FIG. 1a shows a viewer seated in an operating position in front of the stereo CRT 24. The viewer wears the stereo shuttered glasses 120, and manipulates the 3D 6-axis mouse 130. The 3D positions of the 3D mouse 130 and the shuttered glasses 120, relative to the faceplate of the stereo CRT 24, are sensed by a 3D 6-axis head-tracker 140, which is mounted to the stereo CRT 24. The travel time of the ultrasonic sound waves, between the ultrasonic transmitter 142 and the microphones 122 and 132, are used to triangulate the 3D positions of the shuttered glasses 120 and 3D mouse 130. The triangulation of the 3D positions takes into account the speed of sound given the air temperature and other factors.

In operation, the 3D mouse 130 is used to manipulate a virtual image perceived by the viewer. For example, the viewer can uses the 3D mouse 130 to interact with a virtual lathe as illustrated on the video tape entitled High Resolution Virtual Reality Demonstration, submitted concurrently with this Application.

A stereo viewing display pipeline is specified by two 4×4 perspective viewing matrices (effectively, one monocular pipeline for each eye). These matrices implicitly contain information about the overall physical configuration of the viewing.

Previous work in stereo computer graphics concentrated on the generation of a stereo pairs for viewing in an environment where the viewer's position was not well controlled. For examples, refer to the following: Roese, J., and McCleary, L. *Stereoscopic Computer Graphics for Simulation and Modeling*, Proceedings of SIG-GRAPH'79 (Chicago, Ill., Aug. 8-10, 1979), in *Computer Graphics*, pages 41-47, 1979; Schmandt, C., *Spatial Input/Display Correspondence in a Stereographic Computer Graphic Workstation*, Proceedings of SIG-GRAPH'83 (Detroit, Mich., Jul. 25-29, 1983), in *Computer Graphics*, 253-261, 1983; Hibbard, E., et al., *On the Theory and Application of Stereographics in Scientific Visualization*, EUROGRAPHICS '91 (Vienna, Austria, Sep. 2-6, 1991), in *Eurographics '91: State of the Art Reports*, pages 1-21, 1991.

For viewing stereo imagery in environments such as a film theater, there is no single correct view projection. For further discussion, refer to Lipton, L. *Foundations of the Stereoscopic Cinema*, published by Van Nostrand Reinhold, 1982. Various viewing matrix formulations have been used, reflecting different viewing compromises. One approach has taken the left and right viewpoints as corresponding to a rotation about a single point in space, an approach that is correct only for objects as infinity. The present high resolution virtual reality system takes the left and right viewpoints to be offset parallel to the image plane. Each resulting matrix includes a skew component.

The physical configuration of the viewing is determined by the location of the CRT video raster in 3-space and the (dynamic) location of the viewer's eyes. When these parameters are known, the viewing matrices are unique to within a scale factor. The viewing matrix for each eye corresponds to a pyramid whose tip is at the user's eye and whose base is defined my the four corners of the display window within the visible raster of the CRT. The front and back clipping planes are parallel to the plane of the CRT faceplate, if the faceplate is assumed to be perfectly flat. As will be described, the present high resolution virtual reality system corrects inaccuracies caused by the flat faceplate assumption.

Traditional 3D computer graphics viewing models, such as that of the PHIGS standard, involve an abstract camera located in the virtual world and a physical user viewing the scene on a display device in the physical world. A PHIGS application has complete control of the virtual position, orientation, and field of view of the camera. However the application has no access to information about the physical world such as the location of the viewer or the position in space of the display window.

For a virtual reality system with a head-tracked stereo screen display, a viewing model abstraction is needed that promotes the coordinates of the physical world to the status of a first class coordinate system, namely, to physical coordinates (PC).

In the current embodiment, an application specifies the relationship between physical coordinates and virtual coordinates (VC, PHIGS "world coordinates") by a matrix P. The relative position, orientation, and scale implied by the matrix P specify how the virtual and physical worlds are to be superimposed. (This scale factor is denoted g). The physical configuration of the stereo display device and the sensed real-time location of the viewer's eye's contribute the rest of the information necessary to the final 4×4 viewing matrices to be handed to the rendering system implemented on the computer system 10.

Each display device, such as the stereo CRT 24, has a physical coordinate system registered to its display surface: "display plate coordinates" (DPC). Referring to FIG. 3, an example DCP coordinate system is illustrated. DPC has its origin at the lower left hand corner of the visible raster. The x axis proceeds horizontally to the right. The y axis proceeds vertically upwards. The z axis is normal to the display surface, with positive coordinates out towards the viewer. A window on the display is defined by specifying its lower left hand and upper right hand corners as two DPC points L and H on the z=0 plane. Each eye has a separate coordinate in DPC space; a single eyepoint is denoted E. The front and back clipping planes are at distance F and B along the z axis. For further discussion, refer to Foley, J. D., van Dam, A., Feiner, S. K., and Hughes, J. F., *Computer Graphics: Principles and Practice*, 2nd ed., Addison-Wesley, 1990.

The view matrix P for a single eye, expressed in column vector matrix format, that maps visible points in DPC into the extended unit cube of $[-1+1]$ $[-1+1]$ $[-1+1]$, is as follows:

$$P = \begin{bmatrix} \frac{2 \cdot E_z}{H_x - L_x} & 0 & \frac{H_x + L_x - 2 \cdot E_x}{H_x - L_x} & \frac{-E_z \cdot (H_x + L_x)}{H_x - L_x} \\ 0 & \frac{2 \cdot E_z}{H_y - L_y} & \frac{H_y + L_y - 2 \cdot E_y}{H_y - L_y} & \frac{-E_z \cdot (H_y + L_y)}{H_y - L_y} \\ 0 & 0 & \frac{B + F - 2 \cdot E_z}{B - F} & B - E_z - B \cdot \frac{B + F - 2 \cdot E_z}{B - F} \\ 0 & 0 & -1 & E_z \end{bmatrix}$$

To relate the view matrix P to traditional computer graphics models, in the case that only a single display device is present, PC and DPC can be chosen to coincide. In this case, M/g corresponds to the PHIGS "view orientation matrix" and gP to the PHIGS "view mapping matrix", except that PHIGS requires P to be in [0 1] unit cube form.

The equations above apply to display devices such as the field sequential stereo CRT 24, as well as projection stereo displays and stereo LCD panels. It should be noted that the interocular distance, which corresponds to the distance between the viewer's eyes, is not directly represented in the view matrix P. In a head-tracking display system, parallax on the display surface is not necessarily horizontal. If a viewer observes the display with his eyes oriented vertically, then the parallax at the screen will be completely vertical. The amount of parallax at the screen is not consistent even for a given head distance and object location: a viewer with his head turned 30° to one side of the screen has parallax at the screen surface that is less than when he squarely faces the screen.

Some stereo display systems introduce modifications that directly control the maximum amount of parallax in the image to lessen viewer discomfort. For examples, refer to Hibbard, E., et al. *On the Theory and Application of Stereographics in Scientific Visualization*, EUROGRAPHICS '91 (Vienna, Austria, Sep. 2-6, 1991), in *Eurographics '91 State of the Art Reports*, pages 1-21, 1991; and Lipton, L, *The Crystal Eyes Handbook*, Stereographics Corporation, 1991.

A number of techniques can satisfy the important application goal of ensuring that a user can comfortable converge the stereo pair. However, accomplishing this objective by deforming the viewing matrix P will cause the viewing matrices for each eye to diverge from the real physical projection, and preclude the goal of correlating physical and virtual objects. As will be described, the present approach is to get the projection geometry completely correct for arbitrary viewer head position, and deal with convergence as a separable issue.

In traditional computer graphics, the viewing projection point is referred to as the "eyepoint" or "viewpoint" and is intended to correspond to the viewer's eye. However, for the purpose of accurate display, this location must be identified much more precisely physiologically. Optically, in general the "viewpoint" of a lens system is the first nodal point.

Figure 4:
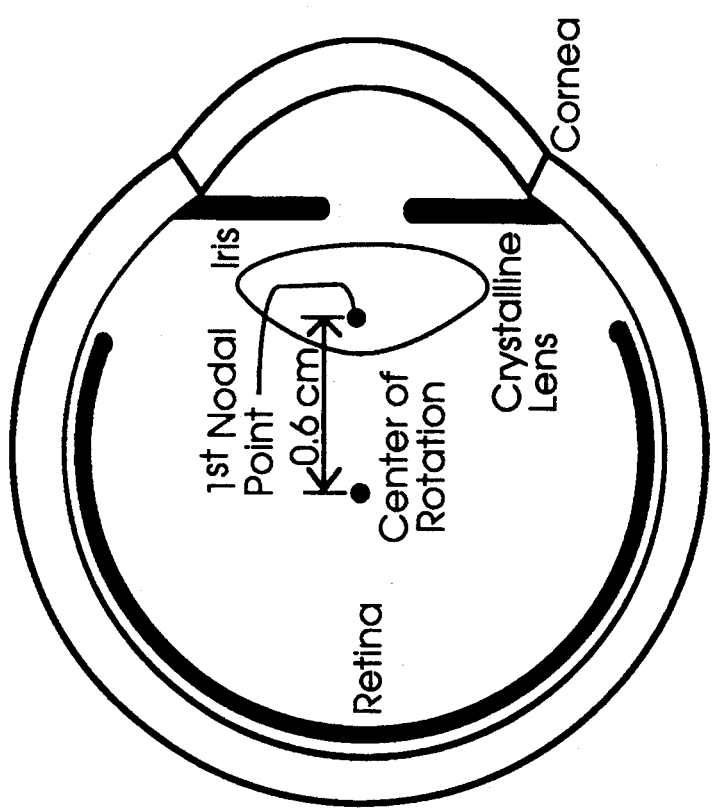
FIG. 4 provides a schematic illustration of the human eye, which can be modeled as a compound lens system-with two lenses. This model of the human eye is used to determine proper viewpoints for a viewer during dynamic head-tracking.

Referring now to FIG. 4, the human eye can be modeled as a compound lens system with two lenses. The first nodal point of this system lies inside the second lens, approximately 0.6 cm from the center of the eye. Bespectacled viewers may require a more complex model. For a discussion of nodal points and human eye models, see Ogle, K. N, *Optics,* Charles C. Thomas, Publisher, Springfield, Ill., 1968, chapter 9.

Because the real "eyepoint" does not lie at the center of rotation of the eye, the exact location of the eyepoint changes slightly depending on the direction of the viewer's gaze. As the eye can readily rotate +45° or more from the center during normal viewing, this represents a potential displacement of eyepoint location of about +0.4 cm.

In stereo viewing the gaze direction is specific: the closer the object the larger the angle between gaze directions (the angle of convergence). Error in the distance between the two eyepoints is more critical than in the absolute eyepoint location: the former more greatly induces perceived depth errors. The error is potentially very damaging at very close distances: in applications having minimum object distances greater than several feet, the eyepoint locations can be assumed to be fixed relative to the head.

Near-perfect compensation for eyepoint location could be achieved by using eye-tracking hardware to acquire information about the direction of gaze of each of the viewer's eyes, in addition to his head position and orientation. This is a promising long term solution, since gaze direction information can be exploited for other purposes such as identifying the region of screen space that corresponds to the fovial portion of the retina, and that deserves to be rendered with the high spatial detail.

In the absence of directly acquired gaze direction information, errors due to uncertainty in eye nodal point location can be minimized by anticipating the likely direction of the viewer's gaze. The likely direction of the viewer's gaze may be the center of the stereo-window on the stereo CRT 24. When a mouse is in use, the viewer's gaze is likely to be in the direction of the "hot spot" of an interactive virtual image, as it is likely that the tightest accuracy requirement reflects "touching" the mouse to a virtual object. Choosing the direction of the viewer's gaze at the mouse tip compensates for errors due to rotation of the eyes. Moreover, the image rendering software implemented on the computer system 10 maintains DPC coordinates for the "hot spot" of the virtual reality image.

Many different technologies have been employed to acquire dynamic viewer head position and orientation information. At present no single technology is superior for all applications. Devices based on magnetic fields tend to have problems with lag and spatial non-linearities. Devices based on ultrasound have line of sight limitations and orientational accuracy. The current embodiment of the present invention employs an ultrasonic tracking device. However, it should be noted that the present method for high resolution virtual reality does not depend on the tracking technology used.

Head-tracking location and orientation data is used to derive the rotational centers of the viewer's eyes moment to moment, using fixed (head coordinate) vectors from the location of the head tracker to the viewer's eyes. The nominal human interocular distance of 6.3 cm can very between individuals by as much as +2 cm; it is therefor important that these vectors be viewer specific. The vectors must also account for the registration of the head tracking device to the viewer's head. This means accounting for how the head tracking stereo glasses sit on a particular viewer's face relative to their eyes. Errors in interocular distance on the order of a fraction of a centimeter can change the stereo perception of depth by an amount several times greater.

It is desirable in head-tracking synthetic stereo imagery for the viewer to perceive computer generated objects as solid, rigid, three dimensional physical objects. In common with monocular systems, it is necessary to have display frame rate sufficient for motion fusion. With stereo imagery there is the additional phenomenon of induced stereo movement, where object displayed at a low frame rate appear to deform and twist. For further discussion, refer to Tyler, C. W., *Induced Stereo movement, Vision Res.,* Vol 14, 609–613, Pergamon Press, 1974.

It is also desirable to minimize perceived lag. Perceived lag is caused by the visual difference between the stereo image generated by the system, and the physically correct image given the viewer's true head position at the time of perception. A number of factors contribute to this lag: errors on head position due to the head-tracking device; the latency of the head-tracking device; and the latency of the image generation hardware. Just as for motion fusion, there appears to be a (soft) maximum degree of perceived lag beyond which the illusion begins to break up. The visual effect is for the virtual object to "distort and jump". While much more detailed formal physiological studies of this issue remain to be performed, initial empirical results are similar to that for motion fusion, i.e., perceived lags should be no more than 50–100 ms.

The effect of latency is reduced by using, instead of a directly sensed location of the viewer's head, a forward prediction of where the viewer's head is likely to be when rendering and display of the next frame is completed. Prediction works best when limited to a few hundreds of milliseconds: the overshoot resulting from longer term prediction is more visually objectionable than the lag.

It is important to correctly choose the parameters to be predicted. If the two eye nodal points are independently extrapolated, then interocular distance is not necessarily maintained, resulting in distortion of depth. A better alternative is to extrapolate the location and orientation of the head, compute the eyeball centers from the predicted head location, and then derive the eye nodal points. The head-location prediction strategy may have to take the characteristics of the particular head tracking device into account. Improved prediction might be possible if a head-tracking device were to provide velocity and/or acceleration data in addition to position and orientation data.

At low head velocities, below about 4 cm/s, the visual advantage due to forward head prediction is small, while the potential for amplifying sensor jitter is large. Thus, depending on the specifics of the sensors used, a filter to ramp down the contribution of the head prediction function at small velocities generally reduces jitter of the virtual object's image when the viewer is trying to hold their head still or by making very fine head movements.

An image on a CRT is not flashed instantaneously on the screen, but rather takes almost a frame time to be fully scanned out. Furthermore, for field sequential stereoscopic displays, the left and right images are offset in time by one field. At 120 Hz field rate, this corresponds to a 8.3 ms temporal offset between the two eye's views. Fortunately, the actual perception of the displayed image is also not instantaneous. The human visual system takes several tens of milliseconds to perceive a stereo pair, and apparently is not sensitive to small temporal errors. For further discussion, refer to Lipton, L, *Temporal Artifacts in Field-Sequential Stereoscopic Displays,* Proceedings of SID'91 (Anaheim, Calif., May 6–10, 1991), pages 834–835.

However, delay in the human visual system does not put a lower limit on perceivable temporal effects, as high head velocities can cause visual blur of virtual objects whose visual counterpart retinal images would have been stabilized.

In the current embodiment, the head position prediction algorithm uses linear interpolation with low velocity and low frame rate ramp down. However, a number of different sensing technologies and higher order prediction algorithms may also be used. For an example of a higher order prediction algorithm, refer to Friedmann, M., Starner, T., Pentland, A. Device *Synchronization Using an Optimal linear Filter,* Association for Computing Machinery, 1992.

The typical viewing projection used in conventional computer graphics and prior virtual reality systems assumes that the light-emitting image plane is planer. However the phosphor screen of a typical CRT is by design a section of a sphere or of a cylinder. Also, the phosphor screen is viewed through a thick glass faceplate that has an index of refraction significantly higher than that of air. In conventional computer graphics, the inaccuracies produced by ignoring these effects are imperceptible. But for high resolution stereo, the errors produced are significant enough to require correction. As will be shown, these errors are viewpoint dependent.

In order to exploit conventional rendering accelerators, the current embodiment implements correction for the physical characteristics of a CRT by modifying the viewing matrix equation P (described above). More specifically, the correction is implemented by adjusting the values L and H. The correction is approximate, but very effective: at present, more accurate correction would impose a prohibitive computational load.

An alternative embodiment improves the correction for CRT optical characteristics by modeling the CRT surface as multiple flat "patches" positioned and titled to approximate the spherical or cylindrical shape of the actual screen. Each patch is rendered separately with a patch-specific viewing matrix. This "piece-wise" approximation takes longer to render than a single patch, although with effective use of bounding box data structures the rendering time increase does not now grow as rapidly as the number of patches.

Another alternative embodiment provides higher accuracy correction by taking into account direction of view information. Most of the distortions previously discussed are only visible to the fovea, that is within an angle of 2°–6° of the gaze direction. If angle of view information is available, either directly as a result of eye tracking, or indirectly through the "hot spot" assumption discussed above, then the correction can be biased to be correct at the point of view, but representable as a single 4×4 viewing matrix.

Every direct-view CRT display has a glass faceplate that intervenes between the image formed on the phosphor and the eye of the viewer. In addition to its function of enclosing the vacuum within the tube, the faceplate provides implosion protection, anti-glare and contrast-improvement functions. For a 21 inch CRT, the faceplate is about 2 cm thick and has an index of refraction in the range of 1.5 to 1.6. At an angle view of 60° normal to the plane of the CRT glass, Snell's law dictates that the glass will bend the light from the phosphor by 25° at the glass/air interface. For further discussion, refer to Foley, J. D., van Dam, A., Feiner, S. K., and Hughes, J. F., Computer Graphics: Principles and Practice, 2nd ed., Addison-Wesley, 1990, pp. 756.

Figure 5:
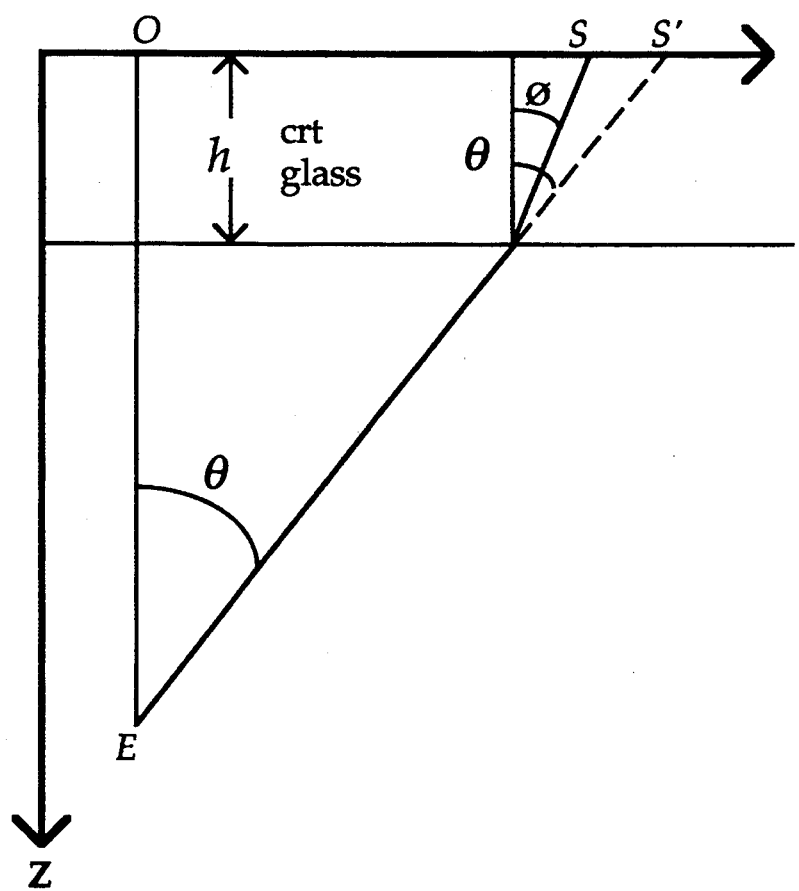
FIG. 5 illustrates refraction caused by a CRT display device's glass display screen, and shows the geometry of an example light ray path through the display screen.

Refraction caused by the CRT glass introduces an apparent positional error of up to 2 cm, depending on eyepoint location. FIG. 5 shows the geometry of the ray paths. (Point O is the projection point of E onto the xy plane.) Approximating the calculation of the incident angle $\theta$, the refraction distortion function of a point S when viewed from the eyepoint E is:

$$\text{ref}(S) = S + h \cdot (\tan \theta - \tan \phi) \cdot \frac{S - O}{f}, \phi = \sin^{-1}\left(\frac{\sin \theta}{n_g}\right)$$

$$\theta \approx \tan^{-1}\left(\frac{f}{E_z}\right), f = \sqrt{(S_x - E_y)^2 + (S_y - E_x)^2}$$

As explained above, the actual image raster of a modern CRT is a section of a sphere or a cylinder. Modern CRT's of the so-called "flat-square-tube" (FST) variety have a radius of curvature of about 2 meters. The curvature is more severe for less flat CRTs. This curvature causes the actual image to deviate from a plane by as much as 1 cm across its faceplate. (Certain CRTs are truly flat, but none of those are presently manufactured with horizontal scan rates sufficient for high resolution 120 Hz field sequential stereo). At a view angle of 60°, and a head position to one side of the CRT and 50 cm away, this curvature represents a potential positional error on the order of 1.8 cm in position.

Figure 6:
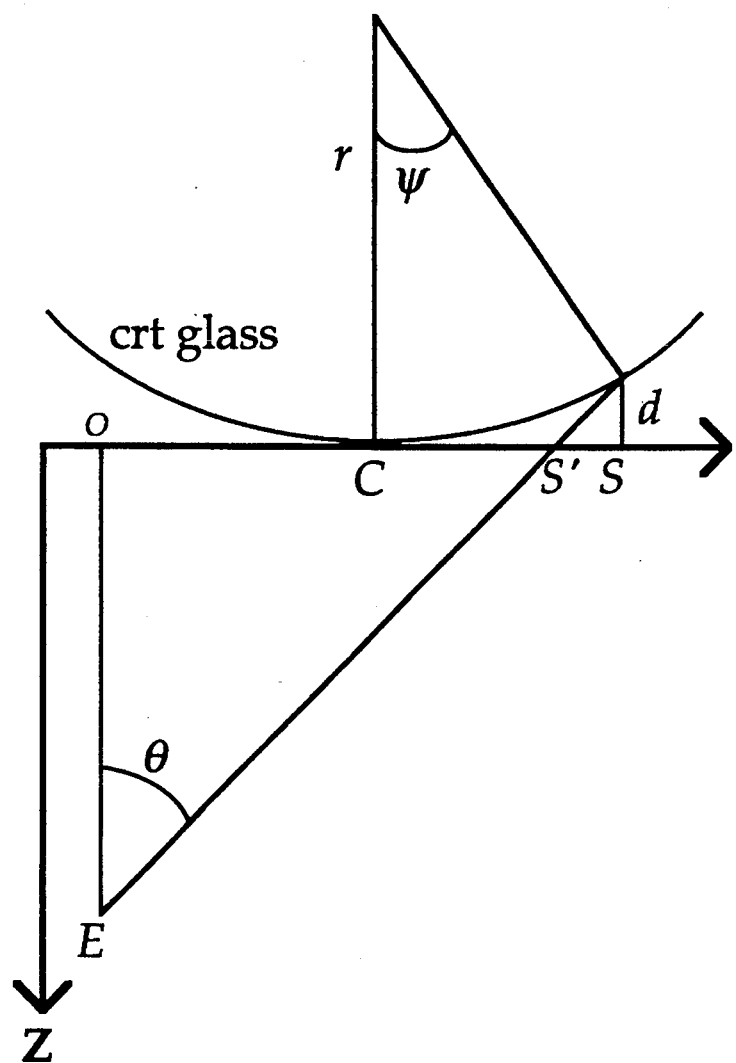
FIG. 6 illustrates the effect of a CRT display device's screen curvature, and depicts the positional error for an example light ray path.

FIG. 6 depicts the geometry of the ray paths. Point C is the tangent to the sphere in display plate coordinates. The screen curvature distortion function for a CRT with spherical section of effective radius r is:

$$\text{sph}(S) = S - d \cdot \tan \theta \cdot \frac{S - O}{f}, d = r \cdot (1.0 - \cos\psi)$$

$$\psi = \sin^{-1}\frac{\sqrt{(S_x - C_x)^2 + (S_y - C_y)^2}}{r}$$

The two types of distortions above apply in opposite directions: the refraction caused by the glass tends to magnify the image; the curvature minifies. But they by no means cancel out. The effects do interact: to be completely accurate the refraction incident angle must be measured relative to the normal of the curving glass. Including this, combined refraction and curvature distortion function is:

$$\text{dis}(S) = S + (h \cdot (\tan \theta' - \tan \phi') - $$

-continued $$r \cdot (1.0 - \cos \psi) \cdot \tan \theta \cdot \frac{S - O}{f}$$

$$\phi' = \sin^{-1}\left(\frac{\sin \theta'}{n_g}\right), \quad \theta' = \cos^{-1}\frac{|v \cdot h|}{|v| \cdot |h|}$$

$$v = [E_x - S_{x'} \; E_y - S_{y'} \; -E_z]$$

$$h = [S_x - C_{x'} \; S_y - C_{y'} \; \sqrt{r^2 - (S_x - C_x)^2 - (S_y - C_y)^2}\,]$$

This distortion function can be used in a number of ways to help correct the screen image. One use is to linearly approximate a correct display, wherein the 3D location of two corners of the display area are adjusted. This yields a final modification to the L and H values to be put to the viewing equation:

$$L' = dis(L), \; H' = dis(H)$$

or to bias the correction for a hot spot Q:

$$L' = L + Q - dis(Q), \; H' = H + Q - dis(Q)$$

FIG. 7 illustrates an alternative embodiment of the present high resolution virtual reality system that uses larger display screens than are available with standard CRTs. In this embodiment, large front or rear projection CRT display screens are used to generate virtual images. For example, display screens that measure from 5 to 10 feet diagonally are suitable.

With the active head tracking system described above, multiple projection display screens are seamlessly combined, even though the display screens are not coplanar. For example, display screen 150 and display screen 160 form a 90 degree angle. This configuration enables the standing viewer wearing the shuttered glasses 120 to perceive a 90 to 180 degree field of view, while viewing the virtual object 170. The corrections discussed above for inaccuracies caused by CRT optical properties are similarly applied to correct for the optical properties of the projection CRTs for each of the display screens 150 and 160.

It will be appreciated that three display screens positioned at 90 degree angles allow the viewer to be visually enclosed for most head turning motions that occur without excessive body turning. Four display screens at 90 degree angles, or three display screens at 120 degree angles enclose the viewer on all sides and allow full body rotation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method for generating an accurate stereo three dimensional image, comprising the steps of:
    measuring a three dimensional eye position for each eye of a viewer, such that the eye positions correspond to points in a three dimensional display plate coordinate space registered to a display screen of a display device;
    generating a viewing matrix for each of the eye positions, the viewing matrices mapping a virtual object mathematically defined in the display plate coordinate space to a pair of display windows generated on the display screen;
    generating corrected viewing matrices by adjusting the viewing matrices that map the virtual object to the display windows to correct for distortion caused by optical properties of the display screen;
    mapping the virtual object mathematically specified in the display plate coordinate space into the display windows using the corrected viewing matrices;
    generating and displaying the virtual object in the display windows in stereo on the display screen.

2. The method of claim 1, wherein the step of generating corrected viewing matrices comprises the steps of:
    determining an area of interaction with the virtual object, the area of interaction controlled by an input device manipulated by the viewer;
    generating the corrected viewing matrices by adjusting the viewing matrices to correct for distortion caused by optical properties of the display screen at the area of interaction.

3. The method of claim 1, wherein the step of generating corrected viewing matrices comprises the step of repositioning the display window within the display plate coordinate space to correct for distortion caused by refraction of light rays as the light rays pass the glass to air boundary of the display screen.

4. The method of claim 1, wherein the step of generating corrected viewing matrices comprises the step of repositioning the display window within the display plate coordinate space to correct for distortion caused by curvature of the display screen.

5. The method of claim 1, wherein the step of generating corrected viewing matrices comprises the step of repositioning the display window within the display plate coordinate space to correct for distortion caused by refraction of light rays as the light rays pass the glass to air boundary of the display screen, and for distortion caused by curvature of the display screen.

6. An apparatus for generating an accurate stereo three dimensional image comprising:
    means for measuring a three dimensional eye position for each eye of a viewer, such that the eye positions correspond to points in a three dimensional display plate coordinate space registered to a display screen of a display device;
    means for generating a viewing matrix for each of the eye positions, the viewing matrices mapping a virtual object mathematically defined in the display plate coordinate space to a pair of display windows generated on the display screen;
    means for generating corrected viewing matrices by adjusting the viewing matrices that map the virtual object to the display windows to correct for distortion caused by optical properties of the display screen;
    means for mapping the virtual object mathematically specified in the display plate coordinate space into the display windows using the corrected viewing matrices;
    means for generating and displaying the virtual object in the display windows in stereo on the display screen.

7. The apparatus of claim 6, wherein the means for generating corrected viewing matrices comprises:

means for determining an area of interaction with the virtual object, the area of interaction controlled by an input device manipulated by the viewer;

means for generating the corrected viewing matrices by adjusting the viewing matrices to correct for distortion caused by optical properties of the display screen at the area of interaction.

8. The apparatus of claim 6, wherein the means for generating corrected viewing matrices comprises means for repositioning the display window within the display plate coordinate space to correct for distortion caused by refraction of light rays as the light rays pass the glass to air boundary of the display screen.

9. The apparatus of claim 6, wherein the means for generating corrected viewing matrices comprises means for repositioning the display window within the display plate coordinate space to correct for distortion caused by curvature of the display screen.

10. The apparatus of claim 6, wherein the means for generating corrected viewing matrices comprises means for repositioning the display window within the display plate coordinate space to correct for distortion caused by refraction of light rays as the light rays pass the glass to air boundary of the display screen, and for distortion caused by curvature of the display screen.

* * * * *

UNITED STATES PATENT AND TRADEMARK OFFICE
CERTIFICATE OF CORRECTION

PATENT NO. : 5,446,834
DATED : August 29, 1995
INVENTOR(S) : Michael Deering

It is certified that error appears in the above-indentified patent and that said Letters Patent is hereby corrected as shown below:

In column 1 at line 46, please delete " .many " and insert -- many --.

In column 4 at line 1, please delete " I/C) " and insert -- I/O --.

In column 10 at line 41, please delete " fiat " and insert -- flat --.

In column 11 at lines 5-6, please delete " $\cos^{-1}\frac{|v \cdot h|}{|v| \cdot |h|}$ " and insert -- $\cos^{-1}\frac{|\bar{v} \cdot \bar{h}|}{|\bar{v}| \cdot |\bar{h}|}$ --.

In column 11 at line 8, please delete " v " and insert -- $\bar{v}$ --.

In column 11 at line 10, please delete " h " and insert -- $\bar{h}$ --.

Signed and Sealed this

Twenty-fourth Day of December, 1996

Attest:

BRUCE LEHMAN

*Attesting Officer*    *Commissioner of Patents and Trademarks*